United States Patent Office 3,179,622
Patented Apr. 20, 1965

3,179,622
POLYSILOXANE ISOCYANATES
Loren A. Haluska, Midland, Mich., assignor to Dow Corning Corporation, Midland, Mich., a corporation of Michigan
No Drawing. Filed Mar. 26, 1962, Ser. No. 182,663
14 Claims. (Cl. 260—46.5)

This invention relates to novel and useful organosiloxane isocyanates that are storable, which vulcanize by exposure to moisture without requiring heating.

The utility of silicone compositions that can be vulcanized without heat is well demonstrated by the wide use of these materials in commerce. Many of the compositions that will so vulcanize are of the two-package type; that is, there are two portions that, when mixed, will thereby vulcanize, said process beginning immediately upon mixing, so that once the two components are mixed the resulting blend must be applied where desired within a short time, else the mixture sets up and is lost.

Recent room temperature vulcanizing silicones that are available are of the one-package type. These materials do not vulcanize until removed from their storage container. Thus, the unused portion is not wasted unless it should be removed from its container. Often these materials are stored in vessels suitable for use with caulking guns and similar equipment. It is this latter type of room temperature vulcanizing material to which the composition of this invention is similar.

Each of the prior known one-component systems has shown some disadvantage. The system based on acetoxysiloxanes or acetoxysilanes shows corrosive activity due to the formation of considerable quantities of acetic acid as a by-product of the vulcanization reaction. Recently disclosed systems based on alkoxysilanes or siloxane oximes produce alcohol or alcohol derivatives during vulcanization which alcohols in a confined system are known to cause at elevated temperatures reversion (depolymerization) of the siloxane chain structure.

The instant compositions vulcanize by exposure to moisture. The only by-product is $CO_2$, a gas. Both $CO_2$ and moisture diffuse easily through siloxanes, allowing thick section or confined cure without corrosion or reversion.

In addition, vulcanizates from the instant composition have higher tensile strength than analogous vulcanizates from the above stated silicone systems, either one component or two component. Also, the urethane-type cross-link formed by the vulcanization process imparts somewhat improved solvent resistance to the rubber.

Further, the product of this invention is useful wherever organic urethane compositions fail on account of poor resistance to moisture and low-temperature embrittlement. Both of the aforesaid limitations are overcome by the instant invented compositions.

One object of this invention is to prepare new organosiloxane isocyanates.

Another object is to prepare organosiloxane isocyanates that can be stored without undergoing change or decomposition.

Another object is to prepare organosiloxane isocyanates that vulcanize when exposed to moisture.

Another object is to prepare organosiloxane isocyanates that vulcanize to a rubber when exposed to moisture which when vulcanized are strong and moisture resistant.

Still another object is to prepare compositions that, upon vulcanization, do not produce corrosive by-products.

A further object is to prepare compositions that, when vulcanized in a confined space, do not undergo reversion.

These and other objects will be apparent from the following description:

This invention relates to an organosiloxane isocyanate represented by the following structure:

$$[O=C=N-Y-N(H)-C(O)-X_b(R'O)_a-W]_n Si[(OSi)_p-W(OR')_a-X_b-C(O)-N(H)-Y-N=C=O]_{4-m-n} R_m R_2$$

wherein
R is a monovalent hydrocarbon or halohydrocarbon radical,
W is a divalent organic radical having at least two carbon atoms therein, connected to silicon by a silicon-to-carbon bond and to the remainder of the molecule through another carbon atom of the radical, and selected from the group consisting of hydrocarbons, hydrocarbon thioethers, hydrocarbon esters, and hydrocarbon tertiary amines,
R' is a divalent aliphatic hydrocarbon radical containing 2 to 4 carbon atoms therein such that no carbon atom shall have more than one oxygen atom attached thereto,
X is —O—, —S—, $$-N(R)-,\ -C(O)-N(H)-,\ -C(O)-N(R)-$$

wherein R is as above defined,
Y is a divalent hydrocarbon radical free of aliphatic unsaturation and containing at least four carbon atoms therein,
$a$ is an integer including 0,
$b$ is 0 or 1,
$m$ is 0, 1 or 2,
$n$ is 0 or 1,
$m+n$ is 0 to 3 inclusive,
$p$ is an integer such that the sum of all said $p$ values in the molecule averages at least that given by the equation (sum of all $p$)=$5(3^{2-m})$, wherein $m$ is as above defined.

The compositions of this invention can have any of the following structures, wherein A represents $$-W-(OR')_a-X_b-C(O)-N(H)-Y-N=C=O$$

(1) $A-Si(OSi)_p A$ with $R_2$, $R_2$ (2) $R_2 Si[(OSi)_p A]_2$ with $R_2$ (3) $A-Si[(OSi)_p A]_2$ with $R$, $R_2$ (4) $RSi[(OSi)_p A]_3$ with $R_2$ (5) $A-Si[(OSi)_p A]_3$ with $R_2$ (6) $Si[(OSi)_p A]_4$ with $R_2$ In structures 1 and 2 the minimum average total of $p$ is 5; in structures 3 and 4 the minimum average total of $p$ is 15; and in structures 5 and 6 the minimum average total of $p$ is 45.

When the minimum average total of p in the molecule is less than the stipulated minimum as illustrated above, the resulting vulcanizates do not have flexibility, or if flexible (due to a large organic modification) do not have the desired low temperature flexibility of the compositions of this invention. In addition, moisture resistance of compositions containing less than the minimum average total p value is impaired thereby.

For the purpose of this invention R can be any monovalent hydrocarbon radical such as alkyl radicals such as methyl, ethyl, isopropyl, tertiaryamyl and octadecyl; alkenyl radicals such as vinyl, allyl, methallyl, and octadecenyl; alkynyl radicals such as ethynyl and butynyl; cycloalkyl radicals such as cyclopentyl and cyclohexyl; cycloalkenyl radicals such as cyclopentenyl; aralkyl radicals such as benzyl and beta-phenylethyl; and aromatic hydrocarbon radicals such as phenyl, xenyl, naphthyl, anthracyl, tolyl and xylyl. R can also be any monovalent halohydrocarbon such as chloromethyl, bromophenyl, 3,3,3-trifluoropropyl, 2-chlorovinyl, α,α,α-trifluorotolyl, α-chloro-α,β,β-trifluorocyclobutyl and bromoxenyl. In any given composition R can be the same or different within the composition. This will be understood more clearly in the description of the preparation of the instant composition.

For the purpose of this invention, W can be any divalent hydrocarbon radical such as alkylene radicals such as —CH$_2$CH$_2$—, —CH$_2$CH$_2$CH$_2$(CH$_2$)$_{12}$—, $$-CH_2\overset{CH_3}{\underset{}{CH}}-,\ -CH_2\overset{CH_3}{\underset{}{CH}}CH_2-,\ \text{and}\ -CH_2\overset{CH_3}{\underset{CH_3}{\overset{|}{C}}}-$$

alkenylene radicals such as —CH=CHCH$_2$—,
—CH$_2$CH=CHCH$_2$—
and $$-CH=\overset{CH_3}{\underset{}{C}}CH_2-$$

cycloalkylene radicals such as cyclobutylene, cyclohexylene and structures such as

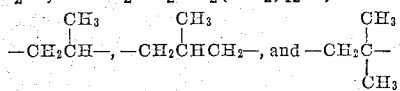

arylene radicals such as phenylene, naphthylene, biphenylene and tolylene; and aralkyl radicals such as
—CH$_2$C$_6$H$_4$CH$_2$—, —C$_6$H$_4$CH$_2$C$_6$H$_4$—
and —CH$_2$CH$_2$C$_6$H$_4$—.

In addition, W can be any divalent hydrocarbon ester radical such as

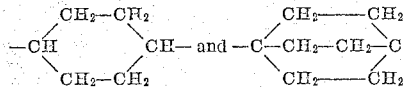

hydrocarbon thioethers such as —CH$_2$CH$_2$—S—CH$_2$—, —CH$_2$CH$_2$CH$_2$—S—CH$_2$CH$_2$—,
—(CH$_2$)$_3$SCH$_2$CH$_2$S(CH$_2$)$_3$—
and $$-CH_2\overset{CH_3}{\underset{}{CH}}-CH_2-S-CH_2$$

and any hydrocarbon tertiary amine radical such as

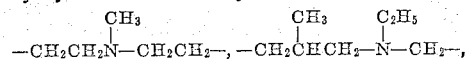

and

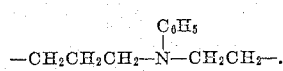

R' can be any divalent aliphatic hydrocarbon radical such as alkylene radicals such as

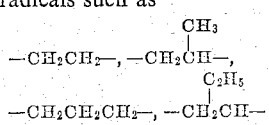

alkenylene radicals such as —CH$_2$CH=CHCH$_2$; and alkynylene radicals such as —CH$_2$C≡CCH$_2$—.

Y can be any divalent hydrocarbon radical free of aliphatic unsaturation such as, for example, aliphatic radicals such as —(CH$_2$)$_4$—, —CH$_2$CH(CH$_3$)(CH$_2$)$_3$—, —CH$_2$CH(CH$_3$)CH$_2$CH$_2$CH(CH$_3$)CH$_2$—,
—CH$_2$CH$_2$CH$_2$C(CH$_3$)$_2$—
and —(CH$_2$)$_{18}$—; cycloalkylene radicals such as

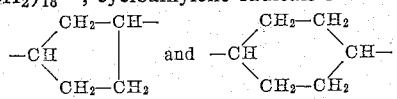

and aromatic radicals such as —C$_6$H$_4$—, —C$_6$H$_4$C$_6$H$_4$—, —C$_6$H$_4$CH$_2$C$_6$H$_4$—, xylylene, tolylene, and naphthylene.

As stated above, the total of p in the formula for the instant composition is $5(3^{2-m})$, else the composition, when vulcanized by exposure to moisture becomes too brittle and/or weak. Any composition with more than the so stated minimum average total p will function as the composition of this invention. Where it is desired to employ a pourable composition, it is preferred to use linear compositions (structures 1 and 2 above) wherein the total averages 20 to about 200.

The compositions of this invention are best prepared from organosiloxanes containing silicon-bonded hydrogen atoms, of the structure $$R_mSi[(OSi)_pH]_{4-m-n}\overset{H_n\ R_2}{\underset{}{}}$$

wherein wherein R, m, n and p are as defined for the composition of the invention. The preparation of these organosiloxanes is well known in the art. They may be prepared, for instance, by the hydrolysis of appropriate amounts of RSiCl$_3$, R$_2$SiCl$_2$, RHSiCl$_2$, HSiCl$_3$, SiCl$_4$ and R$_2$HSiCl, appropriate selection being made therefrom to obtain the particular structure desired. Thus it can be seen that R in the siloxane can be selected to be any monovalent hydrocarbon or halohydrocarbon radical or any combination of the said radicals, determined by the choice and amount of chlorosilane selected. Other methods of preparing the above siloxanes, also well known in the art, allow a similar freedom of choice. In addition, the siloxane above can be a mixture of siloxanes of said formula, wherein the R groups differ for each component of said mixture. This siloxane can be, therefore, a polymer, copolymer or a mixture of polymers and/or copolymers.

The organopolysiloxanes above are reacted with organic compounds containing both aliphatic unsaturation and a functional group selected from the group consisting of —OH, —SH, $$-NH_2,\ -\overset{R}{\underset{}{\overset{|}{N}}}H,\ -\overset{O}{\underset{}{\overset{\|}{C}}}-NRH,\ -\overset{O}{\underset{}{\overset{\|}{C}}}-NH_2\ \text{and}\ -\overset{O}{\underset{}{\overset{\|}{C}}}-OH$$

wherein R above is as previously defined. The reaction is between the silicon-bonded hydrogen and the aliphatic unsaturation, a well known reaction in silicone chemistry, illustrated by the following schematic equations:

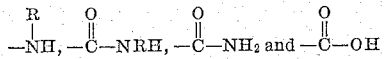

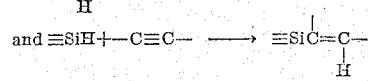

The reaction can be carried out by any of the methods know for this reaction, with or without catalysts in the presence or absence of a solvent, or at atmospheric or different pressure. Stoichiometric quantities of ≡SiH and $$-\overset{|}{\underset{}{C}}=\overset{|}{\underset{}{C}}-$$

or —C≡C— can be used, although it is preferable, but not necessary to use a small excess of say, 10 percent of the unsaturated compound. This excess is easily removed, as it is usually quite volatile. In cases wherein the unsaturated compound is not volatile, it is preferred to use stoichiometric amounts.

The product of the reaction above is an organosiloxane wherein all the silicon-bonded hydrogen atoms are replaced by radicals of the formula $-W(OR')_aX'H$, wherein W and R' are as previously defined, X' is $-O-$, $-S-$,

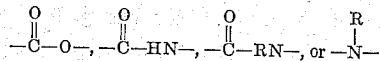

and R is as already described.

The product above is then reacted with an excess of a diisocyanate of the formula $O=C=N-Y-N=C=O$ wherein Y is as hereinbefore described by mixing the two materials. While it is not necessary to do so to cause reaction, warming the mixture to up to about 100° C. will hasten the reaction. Excessive heat should usually be avoided, else extensive crosslinking can result in addition to the desired reaction with some reactants. The reaction equation is as follows:

$\equiv SiW(OR')_aX'H + O=C=NYN=C=O \longrightarrow$

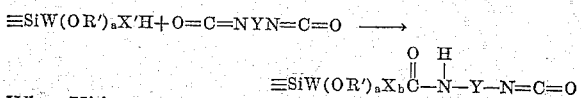

When X' is

the reaction produces $CO_2$, with the net result equivalent to loss of the said radical:

$\equiv SiW(OR')_aC-OH = O=C=N- \longrightarrow$

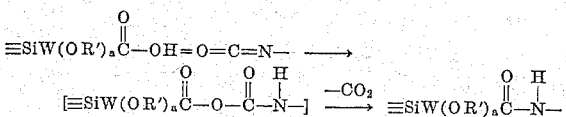

It is in this instance that $b$ in the composition of the invention is O. In all other cases the reaction is one of addition as shown, and the said $b$ is 1. It is clearly seen that in all other instances X' becomes X. Subsequent to reaction any unreacted diisocyanate can be removed by volatilization. The product of this last reaction is the invented composition.

An alternate method of preparing compositions of this invention is applicable with certain organic compounds containing active hydrogen that will add across the double-bond of an alkenyl group. One example of such a compound is thioglycollic acid. The starting siloxane can be one containing an average of two to four alkenyl groups per molecule, of the structure

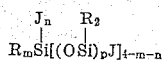

wherein R, $m$, $n$ and $p$ are as previously defined and J is a monovalent alkenyl radical such as vinyl, allyl, methallyl, and cyclopentenyl. Illustrating with thioglycollic acid, the reaction between said acid and the said siloxane above wherein J is vinyl, induced by, for example, ultraviolet light, produces groups wherever J occurred in the siloxane of the following structure:

$-CH_2CH_2-S-CH_2COOH$

The product is converted to the composition of the invention by reaction with a diisocyanate as stated in the description of the previous method of preparation.

A third method of preparation of the instant invented compositions is by preparing a siloxane copolymer of the formula

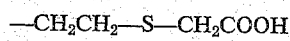

wherein L has the composition $-W(OR')_aX'H$, and all symbols used herein are as previously described. Copolymers of this type can be prepared for instance from the hydrolysis of mixtures selected from $R_2SiCl_2$, $RLSiCl_2$, $R_2LSiCl$, $RSiCl_3$ and $SiCl_4$, and $LSiCl_3$.

Examples of such chlorosilanes are reported in various places in the literature. Other hydrolyzable silanes are of course operable in place of or in conjunction with the chlorosilanes just shown.

The said cohydrolyzate can be converted to the composition of the invention by reaction with a diisocyanate in the before-stated method.

The product of this invention will vulcanize when exposed to moisture, so must be stored away from said moisture to prevent the said vulcanization. So stored, it is stable for an indefinite period of time, at least greater than six months at ordinary temperatures. While the addition of a catalyst to vulcanize the composition is not necessary, it can be used if desired. Such catalysts as are commonly used for polyurethanes such as amines and organotin compounds may be used. If desired, a quantity of organic di- or polyisocyanate can be added to the material of the invention to hasten its cure.

The invented composition can be used alone, or, if desired, such additives as fillers, such as carbon black, fume silica, hydrogels, xerogels, metal oxides, clays, powdered metals, mica, asbestos and the like can be added. In addition, pigments can be employed to obtain a desired color. If desired, additives such as for reducing compression set can also be employed. The above additives may be added either during or after the preparation of the polysiloxane isocyanate. Where maximum storage stability is required, these various additives should be essentially free of moisture. However, where it is desired to cure the mixture shortly after the addition of one or more of the above materials, moisture therein will serve to facilitate the said cure.

The compositions of this invention can be used wherever room-temperature-vulcanizing flexible materials find application wherein extreme heat stability is not required. These include, for instance, molding, potting, encapsulation, sealing, leather treatment, paper treating, and fabric treatment. The instant compositions are especially useful where freedom from corrosion and/or reversion is required. Where low-temperature flexibility is required these materials will also find use.

The following examples are illustrative only, and should not be construed as limiting the invention, which is properly delineated in the appended claims. In the examples the symbol Me represents the methyl radical.

*Example 1*

A mixture of 74.7 grams of methyltrichlorosilane, 6198 grams of dimethyldichlorosilane and 141.9 grams of dimethylhydrogenchlorosilane was made in 3000 grams of heptane and hydrolyzed by addition to an excess of water. The hydrolysis product was neutralized with sodium bicarbonate, washed, dried, filtered and the heptane removed by volatilization. The fluid was equilibrated by mixing with one percent by weight (based on the total weight of fluid) of 15 percent fuming sulfuric acid and stirring for 24 hours at room temperature. The sulfuric acid was then removed by water washing the fluid, and following a stripping to 180° C. at 2 mm. of mercury; 220 grams of a siloxane fluid was obtained having a viscosity of 98.5 cs. at 25° C. of the average formula

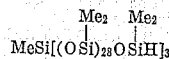

A reaction vessel was charged with 59.8 grams of allyloxypropanol, 140 grams of xylene and 1.7 grams of a solution containing 1 percent platinum as $H_2PtCl_6$ in dimethylphthalate. This mixture was heated to reflux to remove any water in the system. Then 637.9 grams of the siloxane fluid described above were added at such a rate that the temperature was maintained above 135° C. The reaction was sufficiently exothermic that external heat was needed only toward the end of the addition of the siloxane fluid. Thereafter, the mixture was refluxed an additional 24 hours to complete the desired reaction. The product was decolorized with activated charcoal, filtered, and devolatilized to 120° C. at 0.4 mm. of mercury. There was obtained 653.6 grams of a modified siloxane fluid having a viscosity at 25° C. of 171 cs. of the average formula

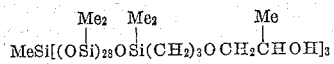

A 562.2 gram portion of the fluid above was mixed with 39.6 grams of toluene diisocyanate in a dry nitrogen atmosphere. The mixture was heated to 70° C. for four hours to hasten the reaction. There was obtained a clear pale yellow fluid as the product of the formula

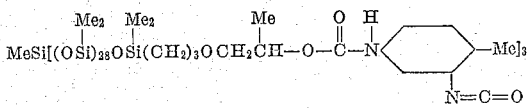

A portion of the product was mixed with a catalytic amount of dibutyltindilaurate and allowed to cure 3 days at room temperature. The rubber so obtained had a hardness (Shore A) of 42, a tensile strength of 318 pounds per inch squared and an elongation of 210 percent.

*Example 2*

A mixture of 2500 grams of octamethylcyclotetrasiloxane, 67.0 grams of tetramethyldihydrogendisiloxane, 36.1 grams of a hydroxyl endblocked methylhydrogenpolysiloxane fluid, and 26 grams of 15 percent fuming sulfuric acid was stirred at room temperature for 24 hours. The sulfuric acid was neutralized by adding 156 grams of sodium bicarbonate and heating the sample to 100° C. for two hours. After a filtration to remove inorganic solids, the material was stripped to 180° C. at 2.7 millimeters of mercury. There was obtained as the product a siloxane fluid of viscosity 96 cs. at 25° C. having the average formula

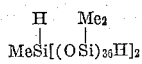

A reactor was flushed with dry nitrogen and thereafter charged with 44.1 grams of tert-butylamino-ethylmethacrylate, 240 grams of xylene and .0139 gram of platinum added as a 1 percent solution of H$_2$PtCl$_6$ in dimethylphthalate. The mixture was heated to reflux and 5,925 grams of the siloxane fluid described above were added slowly over a period of 2 hours. The reaction mixture was heated an additional 24 hours at a temperature of 135° to 140° C. after which the solvents xylene and dimethylphthalate were removed by stripping the product to 140° C. at 2.5 mm. of mercury. The yield was quantitative, a modified siloxane fluid of the average formula:

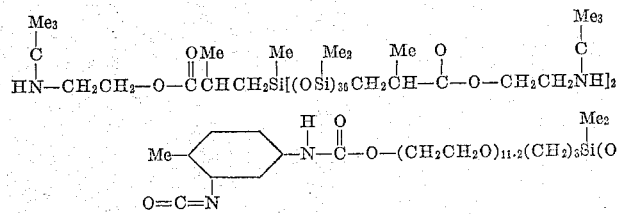

In a reactor were placed 108 grams of perchloroethylene and 8.0 grams of toluene diisocyanate. These materials were mixed at room temperature while slowly adding 100 grams of the modified siloxane fluid prepared as above. The reactants were stirred an additional two hours after complete addition. The product was stripped to 100° C. at 0.1 mm. to remove the unreacted toluene diisocyanate yielding the polysiloxane isocyanate of the structure:

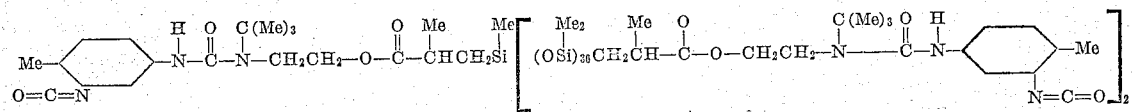

A sample was then cured by heating 24 hours at 80° C. The cured product was a soft rubber.

*Example 3*

A siloxane fluid was prepared according to Example 2 except that there was used 1482 grams of octamethylcyclotetrasiloxane, 67.1 grams of tetramethyldihydrogendisiloxane and 15.5 grams of 15 percent fuming sulfuric acid. There was obtained a clear fluid siloxane having a viscosity of 47.6 cs. at 25° C. of the average formula

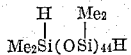

A 328 gram portion of the above siloxane fluid was added to a mixture of 34.9 grams of allyloxypropanol and 2.0 g. of a 1 percent H$_2$PtCl$_6$ solution in dimethylphthalate heated to 128° C. After complete addition of the siloxane, the reactants were stirred at 125° to 135° C. for 24 hours, and thereafter stripped to 1 mm. of mercury at the above temperatures. There was obtained a modified siloxane fluid having a viscosity of 93.3 cs. at 25° C. of the average formula

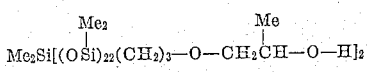

Toluene diisocyanate (22.5 g.) was mixed with the modified siloxane fluid above (181.5 g.) under dry conditions for 3 hours at 80° to 84° C. There was obtained a quantitative yield af a clear fluid having a viscosity of 495 cs. at 25° C. of the average formula

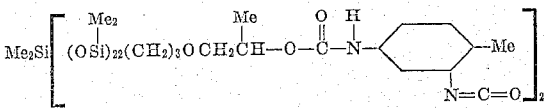

A portion (22.2 grams) of the above fluid was mixed with 0.13 gram of dibutyltindilaurate and allowed to cure. After 24 hours there was obtained a tack-free rubber, which after five days had a tensile strength of 539 pounds per square inch and an elongation of 347 percent. The rubber was flexible at Dry Ice temperature (−78° C.).

*Example 4*

(a) A modified siloxane fluid (1649.9 grams) of the average formula

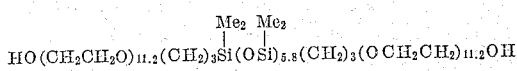

was reacted with 407 grams of toluene diisocyanate at 80° to 82° C. for 3 hours. The product was a fluid product of the average formula

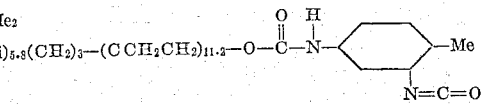

(b) A mixture of 29.25 grams of the above product and 0.75 gram of toluene diisocyanate was exposed to atmospheric moisture for one week. The resulting tack-free rubber had a tensile strength of 516 p.s.i. and an elongation of 222 percent.

(c) A mixture of 27 grams of the product in *a* and 3 grams of toluene diisocyanate was exposed to atmospheric moisture for one week. The tack-free rubber had a tensile strength of 981 p.s.i. and 187 percent elongation.

(d) A solution of 14.62 grams of the product in *a* and 2.14 grams of 4,4′methylene-bis(2-chloraniline) in 16.76 grams of toluene was poured into a flat mold and exposed to the atmosphere. After two days the toluene had evaporated leaving a tack-free elastomer having a tensile strength of 1,086 p.s.i. and an elongation of 232 percent.

(e) A mixture of 10 grams of the product in a, 3 grams of powdered magnesium oxide and 3.5 grams of lampblack was exposed one week to atmospheric moisture. The sample had cured to a strong rubber.

*Example 5*

A mixture was made of 525 g. of a dimethylpolysiloxane fluid of the structure

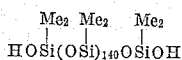

and 15.7 g. of 1,2,2,4-tetramethyl-2-silylpyrrolidine, of the structure

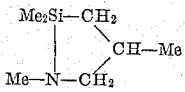

whereupon there was immediate reaction to produce a modified siloxane fluid of the structure

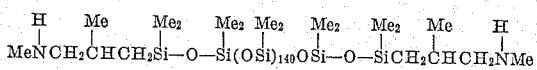

The excess pyrrolidine was removed by stripping to 180° at 0.5 mm. of mercury.

A 375.8 gram portion of the above product was mixed with 37.3 grams of toluene diisocyanate and 175 grams of dry toluene and heated to about 90° C. for about 3 hours. The toluene and excess toluene diisocyanate were removed by stripping the product to 152° C. at 1.1 mm. of mercury. There were obtained 386 grams of a clear fluid having a viscosity of 23,330 cs. at 25° C. of the structure A sample of this fluid cured to a tack-free rubber on exposure to atmospheric moisture for five days. Another sample, mixed with 0.5 percent by weight of dibutyltindilaurate cured in one day to a tack-free elastomer with a tensile strength of 193 pounds per square inch and an elongation of 173 percent.

*Example 6*

Into a reactor were placed (1) 348 grams of a hydroxyl endblocked 3,3,3-trifluoropropylmethylpolysiloxane fluid of the average formula

With vigorous mixing, (2) 78.9 grams of 1,2,2,4-tetramethyl-2-silylpyrrolidine were slowly added and the reaction allowed to proceed. The reaction mixture became hot during the reaction, reaching a peak temperature of 55° C. After complete addition of (2) external heat was applied to maintain the temperature at 55° C. for one hour. Finally, the product was heated to 120° C. at 2.4 mm. of mercury to remove any volatile material, cooled and filtered. The yield was quantitative, having the average formula

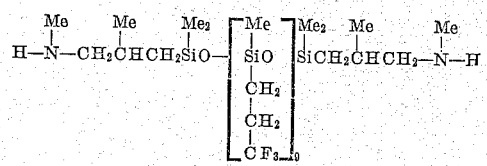

A 100 gram portion of the product from above was added to a mixture of 34.7 grams of toluene diisocyanate, 134.7 grams of methylene chloride and 100 grams of perchloroethylene at such a rate that the temperature in the reaction was maintained below 30° C. The methylene chloride, perchloroethylene and excess toluene diisocyanate were removed by heating the product mixture to 60° C. at 1.2 mm. of mercury. The product was a viscous clear fluid of the structure

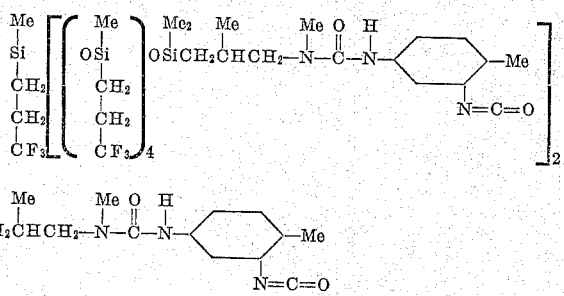

which set up to a hard flexible plastic material on exposure to atmospheric moisture.

*Example 7*

When a modified siloxane fluid of the average formula

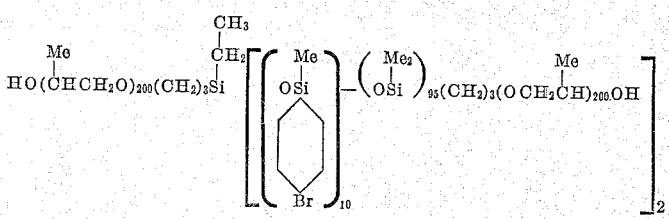

is reacted with a diisocyanate of the formula

O=C=N—⌬—CH₂—⌬—N=C=O as in Example 1, there is obtained the polysiloxane isocyanate of the formula

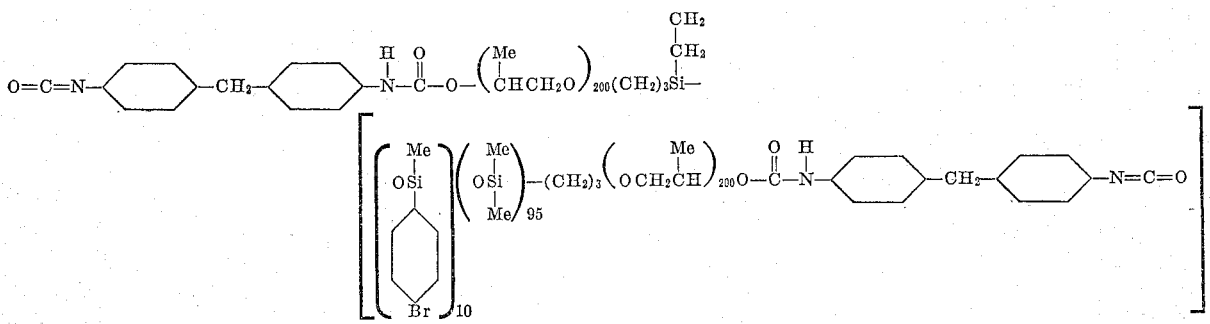

which, when mixed with 3 percent by weight of 4,4'-methylenebis(2-chloroaniline) will cure to a tough rubbery solid.

*Example 8*

A vinyl endblocked dimethylpolysiloxane fluid is obtained when 1480 grams of octamethylcyclotetrasiloxane and 9.3 grams of divinyltetramethyldisiloxane are heated together with 0.25 gram of powdered KOH for several hours at 150° C., of the structure

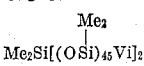
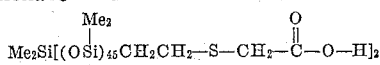

When a solution of the above polymer and thioglycollic acid in toluene is bathed with ultraviolet light at room temperature for about 18 hours, there is formed a modified polysiloxane fluid of the structure

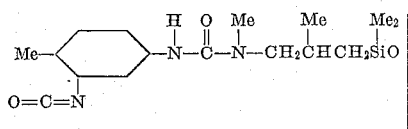

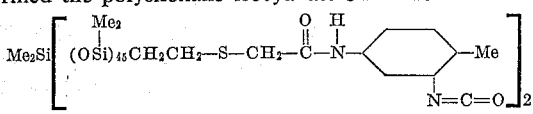

When the modified siloxane fluid from above is reacted as in Example 1 with toluene diisocyanate, there is formed the polysiloxane isocyanate structure

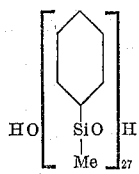

The fluid obtained by the above sequence of operations will vulcanize to a flexible rubbery solid when exposed to moisture.

*Example 9*

Equivalent results are obtained when the following diorganopolysiloxanes are substituted for the dimethylpolysiloxane of Example 5.

(a) A phenylmethylpolysiloxane of the average formula

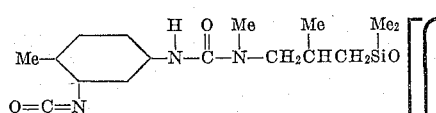

which results in a polysiloxane isocyanate of the structure

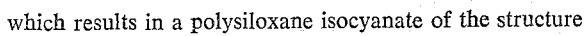

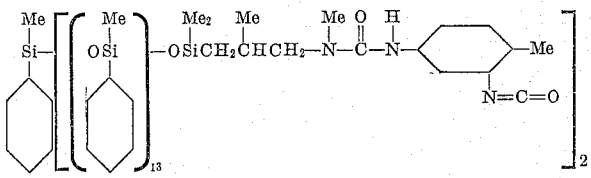

(b) A copolymer of allylmethylsiloxane and cyclohexylmethylsiloxane, of the average composition

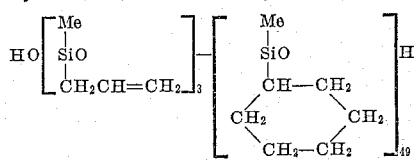

which gives a polysiloxane isocyanate of the structure

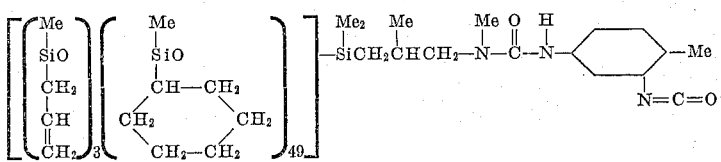

(c) A mixture containing 20 percent by weight of a copolymer of 3-butynylmethylsiloxane and n-octylmethylsiloxane of the composition

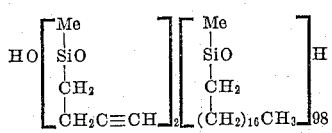

and 80 percent by weight of a 3,3,3-trifluoropropylmethylpolysiloxane fluid of the structure

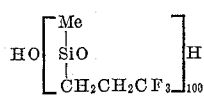

The polysiloxane isocyanate formed is a mixture containing units of the structure

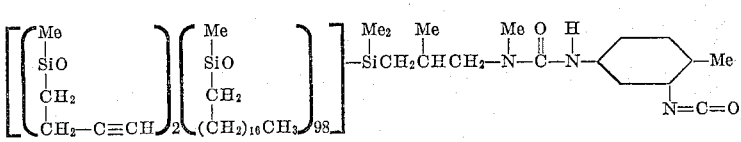

and

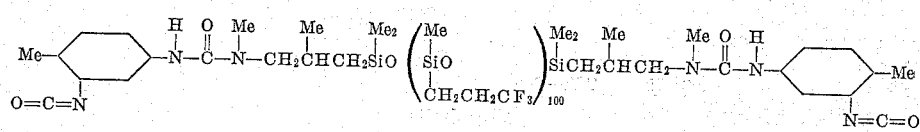

(d) A copolymer containing (2-phenylethyl)methylsiloxane units, cyclopentenylmethylsiloxane units and ethylmethylsiloxane units of the average composition

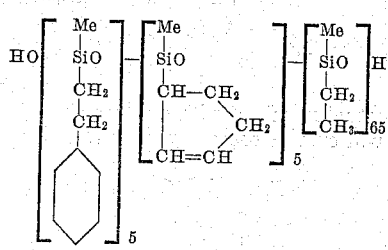

will produce a polysiloxane isocyanate of the average composition

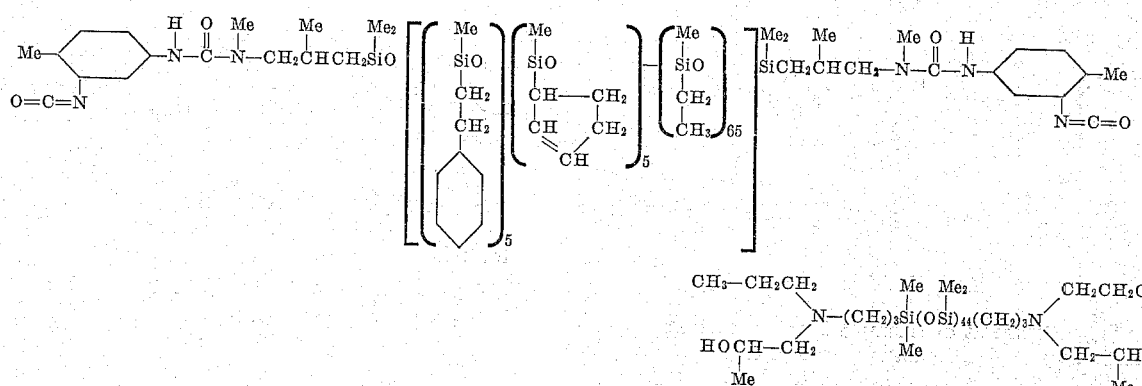

Example 10

When 67.7 grams of HSiCl₃ are substituted for the 74.7 grams of methyltrichlorosilane in Example 1, there is obtained in the hydrolysis a fluid of the average formula

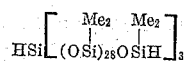

which, when further reacted with propargyl alcohol in the presence of a platinum catalyst forms a modified polysiloxane fluid of the structure

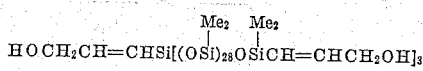

When the above compound is reacted with an excess of hexamethylenediisocyanate and the unreacted diisocyanate thereafter removed, there is obtained a polysiloxane isocyanate of the structure

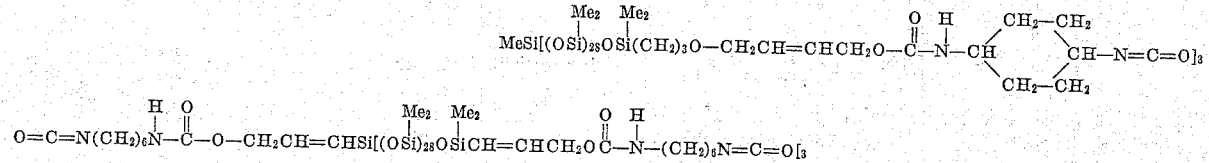

which, on exposure to moisture cures to a strong flexible solid.

Example 11

When allylpropylamine and propylene oxide are mixed in approximately equimolar quantity and warmed to about 100° at autogenous pressure, there is formed the tertiary amine of the structure

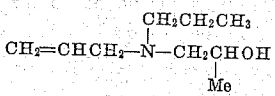

A modified polysiloxane is formed when the above amine is added to the siloxane fluid of Example 3

[Me₂HSi(OSi)₄₄H]

by a platinum catalyzed addition, having the average formula

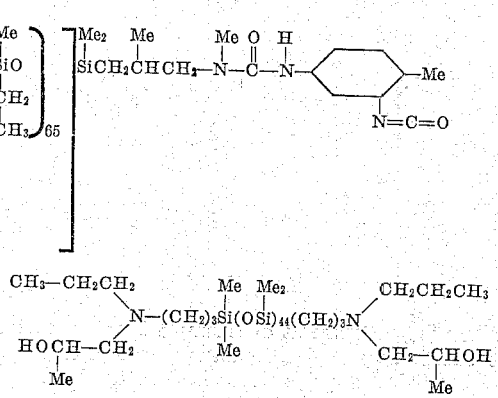

which in turn, when reacted with an excess of hexamethylenediisocyanate and the unreacted diisocyanate removed, will provide a polysiloxane isocyanate of the average formula

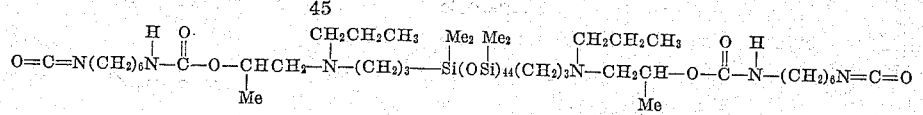

The product above, when mixed with 1 percent by weight of dibutyltindilaurate, will cure to a flexible strong solid.

Example 12

When the monoallylether of 2-butene-1,4-diol is substituted for the allyloxypropanol of Example 1 there is obtained a modified polysiloxane fluid of the average formula

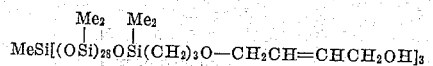

A polysiloxane isocyanate which will cure on exposure to moisture to a tack-free flexible solid is formed when the modified polysiloxane above is reacted with cyclohexane-1,4-diisocyanate of the average formula

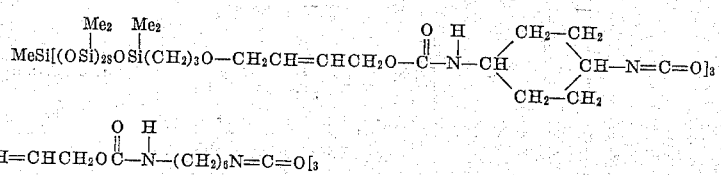

Similar results are obtained to the above when the monoallyl ether of 2-butyne-1,4-diol is substituted for the monoallyl ether of 2-butene-1,4-diol. The polysiloxane isocyanate of the average formula $$\text{MeSi}[(\text{OSi})_{28}\text{OSi}(\text{CH}_2)_3\text{OCH}_2\text{—C}\equiv\text{C—CH}_2\text{O}\overset{\text{O}}{\overset{\|}{\text{C}}}\text{—}\overset{\text{H}}{\overset{|}{\text{N}}}\text{—}\overset{\text{CH}_2\text{—CH}_2}{\underset{\text{CH}_2\text{—CH}_2}{\text{CH}}}\text{CH—N=C=O}]_3$$

is thereby formed, which will cure to a flexible tack-free rubber on exposure to moisture.

Example 13

When methacrylic acid is added to the siloxane fluid of Example 2 using a platinum catalyst, and the resulting compound treated first with thionyl chloride and then with anhydrous ammonia in anhydrous ether, there is obtained a modified polysiloxane fluid of the average structure $$\text{H}_2\text{N}\overset{\text{O}}{\overset{\|}{\text{C}}}\text{—}\overset{\text{Me}}{\overset{|}{\text{CH}}}\text{CH}_2\text{—}\overset{\text{Me}}{\overset{|}{\text{Si}}}[(\text{OSi})_{36}\text{CH}_2\overset{\text{Me}}{\overset{|}{\text{CH}}}\text{—}\overset{\text{O}}{\overset{\|}{\text{C}}}\text{—NH}_2]_2$$

when further reacted with toluene diisocyanate as in Example 1 will form a polysiloxane isocyanate of the average formula $$\text{Me—}\langle\rangle\text{—}\overset{\text{H}}{\overset{|}{\text{N}}}\text{—}\overset{\text{O}}{\overset{\|}{\text{C}}}\text{—}\overset{\text{H}}{\overset{|}{\text{N}}}\text{—}\overset{\text{O}}{\overset{\|}{\text{C}}}\text{—}\overset{\text{Me}}{\overset{|}{\text{CH}}}\text{CH}_2\text{—}\overset{\text{Me}}{\overset{|}{\text{Si}}}[(\text{OSi})_{36}\text{CH}_2\overset{\text{Me}}{\overset{|}{\text{CH}}}\text{—}\overset{\text{O}}{\overset{\|}{\text{C}}}\text{—}\overset{\text{H}}{\overset{|}{\text{N}}}\text{—}\overset{\text{O}}{\overset{\|}{\text{C}}}\text{—}\overset{\text{H}}{\overset{|}{\text{N}}}\text{—}\langle\rangle\text{—Me}]_2$$
O=C=N
N=C=O This fluid will cure to a flexible tack-free solid when exposed to moisture.

Example 14

When the experiments of Example 3 are repeated, except substituting allyl mercaptan for allyloxypropanol, there is obtained a polysiloxane isocyanate of the average formula $$\text{Me}_2\text{Si}\left[\overset{\text{Me}_2}{\overset{|}{(\text{OSi})_{22}}}(\text{CH}_2)_3\text{S}\overset{\text{O}}{\overset{\|}{\text{C}}}\text{—}\overset{\text{H}}{\overset{|}{\text{N}}}\text{—}\langle\rangle\text{—Me}\right]_2$$
N=C=O which will cure to a tack-free flexible solid on exposure to moisture.

Example 15

When metavinylphenol is added to a polysiloxane fluid of the structure $$\left[\overset{\phi}{\overset{|}{\text{Si}}}(\text{OSi})_{35}\text{H}\atop\underset{\text{Me}}{}\right]_4$$

in the presence of a platinum catalyst, there is formed a modified polysiloxane of the structure $$\left[\overset{\phi}{\overset{|}{\text{Si}}}(\text{OSi})_{35}\text{—CH}_2\text{CH}_2\text{—}\langle\rangle\text{—OH}\atop\underset{\text{Me}}{}\right]_4$$

When this product is reacted with an excess of 1,4-butanediisocyanate and the unreacted diisocyanate thereafter removed, there remains a polysiloxane isocyanate of the formula $$\left[\overset{\phi}{\overset{|}{\text{Si}}}(\text{OSi})_{35}\text{—CH}_2\text{CH}_2\text{—}\langle\rangle\text{—O}\overset{\text{O}}{\overset{\|}{\text{C}}}\text{—}\overset{\text{H}}{\overset{|}{\text{N}}}\text{—(CH}_2)_4\text{—N=C=O}\atop\underset{\text{Me}}{}\right]$$

This product when mixed with one percent of dibutyltindilaurate, will cure at room temperature to a tack-free flexible solid.

Example 16

When the compound $$\underset{\text{CH—CH}_2}{\overset{\text{CH—CH}_2}{}}\text{CHOH}$$

is substituted for allyloxypropanol in the process of Example 3, the resulting polysiloxane isocyanate is of the average formula $$\text{Me}_2\text{Si}\left[\overset{\text{Me}_2}{\overset{|}{(\text{OSi})_{22}}}\text{—}\overset{\text{CH}_2\text{—CH}_2}{\overset{}{\text{CH}}}\text{CHO}\overset{\text{O}}{\overset{\|}{\text{C}}}\text{—}\overset{\text{H}}{\overset{|}{\text{N}}}\text{—}\langle\rangle\text{—Me}\right]_2$$
CH$_2$
N=C=O which cures to a flexible tack-free solid on exposure to moisture.

Example 17

When methylamine is substituted for ammonia and a diisocyanate of the structure $$\text{O=C=N—}\langle\overset{\text{Me}}{}\rangle\text{—}\langle\overset{\text{Me}}{}\rangle\text{—N=C=O}$$

substituted for toluene diisocyanate in Example 13 there is obtained a polysiloxane isocyanate of the structure $$\text{O=C=N—}\langle\overset{\text{Me}}{}\rangle\text{—}\langle\overset{\text{Me}}{}\rangle\text{—}\overset{\text{H}}{\overset{|}{\text{N}}}\text{—}\overset{\text{O}}{\overset{\|}{\text{C}}}\text{—}\overset{\text{Me}}{\overset{|}{\text{N}}}\text{—}\overset{\text{O}}{\overset{\|}{\text{C}}}\text{—}\overset{\text{Me}}{\overset{|}{\text{CH}}}\text{CH}_2\text{Si}\left[(\text{OSi})_{30}\text{CH}_2\overset{\text{Me}}{\overset{|}{\text{CH}}}\text{—}\overset{\text{O}}{\overset{\|}{\text{C}}}\text{—}\overset{\text{Me}}{\overset{|}{\text{N}}}\text{—}\overset{\text{O}}{\overset{\|}{\text{C}}}\text{—}\overset{\text{H}}{\overset{|}{\text{N}}}\text{—}\langle\overset{\text{Me}}{}\rangle\text{—}\langle\overset{\text{Me}}{}\rangle\text{—N=C=O}\right]_2$$

which cures to a tack-free elastomer on exposure to moisture.

Example 18

When a polysiloxane fluid of the structure $$\text{CH}_2\text{=CClSi}\overset{\text{Me}}{\underset{}{}}\left[(\text{OSi})_{40}\text{OH}\right]_2\overset{\text{Me}_2}{\underset{}{}}$$

is substituted for the fluid of Example 6 and hexamethylene diisocyanate substituted for toluene diisocyanate of that example, there is obtained the polysiloxane diisocyanate of the structure $$\text{CH}_2\text{=CClSi}\overset{\text{Me}}{\underset{}{}}\left[(\text{OSi})_{40}\text{OSiCH}_2\overset{\text{Me}}{\overset{|}{\text{CH}}}\text{CH}_2\text{—}\overset{\text{Me}}{\overset{|}{\text{N}}}\text{—}\overset{\text{O}}{\overset{\|}{\text{C}}}\text{—}\overset{\text{H}}{\overset{|}{\text{N}}}\text{—(CH}_2)_6\text{—N=C=O}\right]$$

which when exposed to moisture will cure to a flexible strong elastomer.

That which is claimed is:

1. An organosiloxane isocyanate of the structure

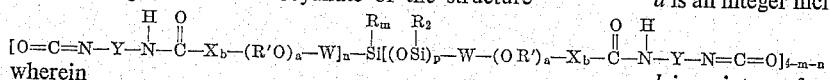

wherein
R is selected from the group consisting of monovalent hydrocarbon radicals and monovalent halohydrocarbon radicals,
W is a divalent organic radical having at least two carbon atoms therein, connected to silicon by a silicon-to-carbon bond and to the remainder of the molecule through another carbon atom of the radical and being selected from the group consisting of hydrocarbons, hydrocarbon thioethers, hydrocarbon esters, and hydrocarbon tertiary amines,
R' is a divalent aliphatic radical having two to four carbon atoms such that no carbon atom shall have more than one oxygen atom attached thereto,
X is selected from the group consisting of —O—, —S—,

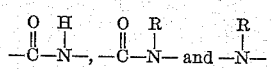

wherein R is as above defined,
Y is a divalent hydrocarbon radical free of aliphatic unsaturation having at least four carbon atoms therein,
$a$ is an integer including 0,
$b$ is an integer from 0 to 1 inclusive,
$m$ is an integer from 0 to 2 inclusive,
$n$ is an integer from 0 to 1 inclusive,
$m+n$ is an integer from 0 to 3 inclusive,
$p$ is an integer such that the sum of all $p$ values in the molecule averages at least that given by the equation (sum of all $p$) $=5(3^{2-m})$, wherein $m$ is as above defined.

2. An organosiloxane isocyanate according to claim 1 wherein R is methyl, W is trimethylene, $a$ is 0, X is divalent oxygen and Y is —C$_6$H$_3$(CH$_3$)—.

3. An organosiloxane isocyanate according to claim 1 wherein R is methyl, W is trimethylene, R' is

—CH$_2$CH(CH$_3$)—

$a$ is 1, X is divalent oxygen and Y is —C$_6$H$_4$(CH$_3$)—.

4. An organosiloxane isocyanate according to claim 1 wherein R is trifluoropropyl and methyl, W is trimethylene, $a$ is 0, X is divalent oxygen and Y is —C$_6$H$_3$(CH$_3$)—.

5. A composition of matter consisting essentially of
(1) an organosiloxane isocyanate of the structure

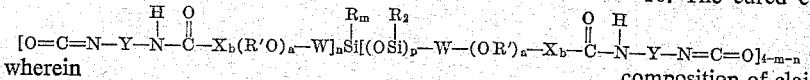

wherein
R is selected from the group consisting of monovalent hydrocarbon radicals and monovalent halohydrocarbon radicals,
W is a divalent organic radical having at least two carbon atoms therein, connected to silicon by a silicon-to-carbon bond and to the remainder of the molecule through another carbon of the radical and being selected from the group consisting of hydrocarbons, hydrocarbon thioethers, hydrocarbon esters, and hydrocarbon tertiary amines,
R' is a divalent aliphatic radical having two to four carbon atoms such that no carbon atom shall have more than one oxygen atom attached thereto,
X is selected from the group consisting of —O—, —S—,

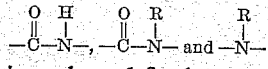

wherein R is as above defined,

Y is a divalent hydrocarbon radical free of aliphatic unsaturation having at least four carbon atoms therein,
$a$ is an integer including 0,
$b$ is an integer from 0 to 1 inclusive,
$m$ is an integer from 0 to 2 inclusive,
$n$ is an integer from 0 to 1 inclusive,
$m+n$ is an integer from 0 to 3 inclusive,
$p$ is an integer such that the sum of all $p$ values in the molecule averages at least that given by the equation (sum of all $p$) $=5(3^{2-m})$, wherein $m$ is as above defined, and
(2) a filler.

6. An organopolysiloxane isocyanate of the structure

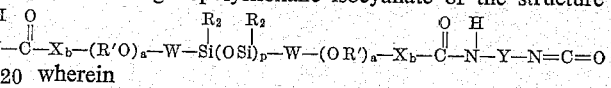

wherein
R is selected from the group consisting of monovalent hydrocarbon radicals and monovalent halohydrocarbon radicals,
W is a divalent organic radical having at least two carbon atoms therein, connected to silicon by a silicon-to-carbon bond and to the remainder of the molecule through another carbon atom of the radical and being selected from the group consisting of hydrocarbons, hydrocarbon thioethers, hydrocarbon esters and hydrocarbon tertiary amines,
R' is a divalent aliphatic radical having two to four carbon atoms such that no carbon atom shall have more than one oxygen atom attached thereto,
X is selected from the group consisting of —O—, —S—,

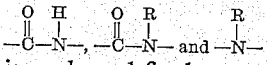

wherein R is as above defined,
Y is a divalent hydrocarbon radical free of aliphatic unsaturation having at least four carbon atoms therein,
$a$ is an integer including 0,
$b$ is an integer from 0 to 1 inclusive, and
$p$ is an integer from 20 to 200 inclusive.

7. The composition of matter consisting essentially of (1) the organopolysiloxane isocyanate of claim 2 and (2) a filler.

8. The cured flexible solid obtained from the composition of claim 1 by exposure of the said composition to moisture.

9. The cured composition obtained by exposing the composition of claim 2 to moisture.

10. The cured composition obtained by exposing the composition of claim 3 to moisture.

11. The cured composition obtained by exposing the composition of claim 4 to moisture.

12. The cured composition obtained by exposing the composition of claim 5 to moisture.

13. The cured composition obtained by exposing the composition of claim 6 to moisture.

14. The cured composition obtained by exposing the composition of claim 7 to moisture.

References Cited by the Examiner
UNITED STATES PATENTS
2,527,590   10/50   Speier _____ 260—46.5
FOREIGN PATENTS
580,932   8/59   Canada.

MURRAY TILLMAN, *Primary Examiner.*
JOSEPH L. SCHOFER, *Examiner.*